(12) United States Patent
Nyuugaku et al.

(10) Patent No.: US 10,683,312 B2
(45) Date of Patent: Jun. 16, 2020

(54) GLYCOLURIL RING-CONTAINING ORGANOSILICON COMPOUND AND MAKING METHOD

(71) Applicant: SHIN-ETSU CHEMICAL CO., LTD., Tokyo (JP)

(72) Inventors: Takeshi Nyuugaku, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/381,998

(22) Filed: Apr. 11, 2019

(65) Prior Publication Data

US 2019/0315779 A1 Oct. 17, 2019

(30) Foreign Application Priority Data

Apr. 12, 2018 (JP) ................................. 2018-076577

(51) Int. Cl.
*C07F 7/18* (2006.01)

(52) U.S. Cl.
CPC .......... *C07F 7/1804* (2013.01); *C07F 7/1876* (2013.01)

(58) Field of Classification Search
CPC combination set(s) only.
See application file for complete search history.

(56) References Cited

FOREIGN PATENT DOCUMENTS

| JP | 8-333375 A | 12/1996 |
|---|---|---|
| JP | 2015-59101 A | 3/2015 |
| JP | 2017-8017 A | 1/2017 |
| WO | WO 2015/163355 A1 | 10/2015 |

OTHER PUBLICATIONS

Kumano, 2017, caplus an 2017:71702 (Year: 2017).*
Kamuro et al., caplus an 2015:1732339.*
Extended European Search Report dated Jun. 7, 2019, in European Patent Application No. 19167462.1.

* cited by examiner

*Primary Examiner* — Sun Jae Yoo
(74) *Attorney, Agent, or Firm* — Birch, Stewart, Kolasch & Birch, LLP

(57) ABSTRACT

Provided is a glycoluril ring-containing organosilicon compound having 4 organoxysilyl groups to form silanol groups capable of covalently bonding with hydroxyl groups on an inorganic material surface. The compound imparts mechanical strength and adhesion to an organic/inorganic composite material.

3 Claims, 8 Drawing Sheets

GLYCOLURIL RING-CONTAINING ORGANOSILICON COMPOUND AND MAKING METHOD

CROSS-REFERENCE TO RELATED APPLICATION

This non-provisional application claims priority under 35 U.S.C. § 119(a) on Patent Application No. 2018-076577 filed in Japan on Apr. 12, 2018, the entire contents of which are hereby incorporated by reference.

TECHNICAL FIELD

This invention relates to a glycoluril ring-containing organosilicon compound and a method for preparing the same.

BACKGROUND ART

An organosilicon compound having a hydrolyzable silyl group and an organic group enables to bond an organic material and an inorganic material that would otherwise be difficult to bond, through the mechanism that the hydrolyzable silyl group is hydrolyzed to form a silanol group which covalently bonds with a hydroxyl group on the surface of the inorganic material whereas the organic group reacts with the organic material. This enables to endow organic/inorganic composite materials with heat resistance, water resistance, weather resistance, improved mechanical strength, adhesion, dispersibility, hydrophobicity, and rust prevention properties. By virtue of these advantages, the organosilicon compounds are used in a wide variety of fields and applications, for example, silane coupling agents, resin additives, surface treating agents, textile treating agents, adhesives, paint additives, and polymer modifiers.

Among the organosilicon compounds, organosilicon compounds having a urea skeleton such as a ureido group, isocyanurate ring or glycoluril ring are known as especially useful compounds in the above-mentioned applications because they can impart excellent mechanical strength and adhesion to organic/inorganic composite materials.

Exemplary organosilicon compounds having a urea skeleton include organosilicon compounds having an ureido group such as 3-ureidopropyltriethoxysilane (Patent Document 1) and organosilicon compounds having a glycoluril ring such as 1,3,4,6-tetrakis(dimethylphenylsilyltrimethylene)glycoluril (Patent Document 2).

It is known that the glycoluril ring-containing organosilicon compounds cure into products having improved weather resistance, heat resistance, light resistance, electrical insulation, and adhesion. These organosilicon compounds are thus useful as molding materials, coating materials, insulators, encapsulants, adhesives, and resin additives for electrical and electronic parts, automobile parts, and optical parts.

CITATION LIST

Patent Document 1: JP-A H08-333375
Patent Document 2: JP-A 2015-059101

SUMMARY OF INVENTION

The ureido-containing organosilicon compound in Patent Document 1 may fail to fully exert the desired effects as a silane coupling agent, resin additive or the like because the compound forms at most 3 silanol groups which function as reactive sites to an inorganic material and it has only one silicon atom to form a silanol group per ureido group.

On the other hand, the glycoluril ring-containing organosilicon compound is expected to exert the desired effects as a silane coupling agent, resin additive or the like because at most 4 silanol-forming silicon atoms may be introduced via 4 nitrogen atoms in the heterocycle. The glycoluril ring-containing organosilicon compound in Patent Document 2, however, has organosilyl groups which are not hydrolyzable or organosiloxy groups which are unstable after hydrolysis. That is, no hydrolyzable organoxysilyl groups are contained.

Since organosilyl groups do not form silanol groups and thus do not covalently bond with hydroxyl groups on an inorganic material surface, the compound having organosilyl groups fails to exert the desired effects as silane coupling agent, resin additive or the like. In the case of the compound having organosiloxy groups, since the siloxane bond is inferior in mechanical strength to other organic resins, the cured product may have poor mechanical strengths such as tensile strength, tear strength and frictional resistance. Moreover, the siloxane bond may be severed and recombined due to hydrolysis, forming unwanted low molecular weight chain-like or cyclic siloxanes. As a result, the cured product may have reduced hardness and degraded durability. Not only the desired effects as silane coupling agent, resin additive or the like are negated, but also other properties may be adversely affected.

One well-known method for preparing organoxysilyl-containing organosilicon compounds is hydrosilylation reaction of an alkenyl compound having an unsaturated bond (i.e., carbon-carbon double bond) with an organoxysilyl-containing hydrogensilane compound in the presence of a platinum catalyst.

However, it is also known that when a glycoluril ring-containing alkenyl compound is hydrosilylation reacted with an organoxysilyl-containing hydrogensilane compound, heteroatoms in the heterocycle reduce the activity of the platinum catalyst, interfering with the hydrosilylation reaction. Therefore, it is difficult to introduce 4 silicon atoms capable of forming silanol groups into the compound via 4 nitrogen atoms in the heterocycle. It is thus believed difficult to prepare in high purity an organosilicon compound having an organoxysilyl group on all 4 nitrogen atoms in the glycoluril ring.

There is a desire to have a glycoluril ring-containing organosilicon compound which has 4 organoxysilyl groups to form silanol groups capable of covalently bonding with hydroxyl groups on an inorganic material surface, and which imparts excellent mechanical strength and adhesion to an organic/inorganic composite material.

An object of the invention is to provide a glycoluril ring-containing organosilicon compound which has 4 organoxysilyl groups to form silanol groups capable of covalently bonding with hydroxyl groups on an inorganic material surface, and which imparts excellent mechanical strength and adhesion to an organic/inorganic composite material, and a method for preparing the compound.

SUMMARY OF INVENTION

The inventors have found that by effecting hydrosilylation reaction of a glycoluril ring-containing alkenyl compound with an organoxysilyl-containing hydrogensilane compound in the presence of an acid amide compound and a platinum catalyst, an organosilicon compound having an organoxysilyl group on each of 4 nitrogen atoms in the glycoluril ring is prepared in high purity; and that the glycoluril ring-containing organosilicon compound imparts excellent mechanical strength and adhesion to organic/inorganic composite materials and exerts the desired effects when used as a silane coupling agent, resin additive, surface treating agent, textile treating agent, adhesive, paint additive, polymer modifier or the like.

In one aspect, the invention provides a glycoluril ring-containing organosilicon compound having the general formula (1).

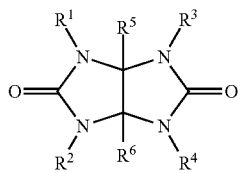

(1)

Herein $R^1$, $R^2$, $R^3$ and $R^4$ are each a group having the general formula (2):

$$-R^7-SiR^8{}_n(OR^9)_{3-n} \quad (2)$$

wherein $R^7$ is a substituted or unsubstituted $C_3$-$C_6$ divalent hydrocarbon group, $R^8$ and $R^9$ are each independently a substituted or unsubstituted $C_1$-$C_{10}$ monovalent hydrocarbon group, and n is an integer of 0 to 2. $R^5$ and $R^6$ are each independently hydrogen or a substituted or unsubstituted $C_1$-$C_{10}$ monovalent hydrocarbon group.

In another aspect, the invention provides a method for preparing the glycoluril ring-containing organosilicon compound, comprising the step of effecting hydrosilylation reaction of a glycoluril ring-containing alkenyl compound having the general formula (3):

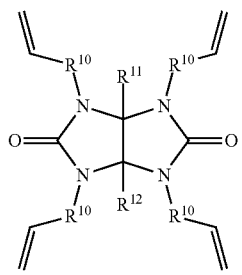

(3)

wherein $R^{10}$ is a substituted or unsubstituted $C_1$-$C_4$ divalent hydrocarbon group and $R^{11}$ and $R^{12}$ are each independently hydrogen or a substituted or unsubstituted $C_1$-$C_{10}$ monovalent hydrocarbon group, with an organoxysilyl-containing hydrogensilane compound having the general formula (4):

$$H-SiR^{13}{}_n(OR^{14})_{3-n} \quad (4)$$

wherein $R^{13}$ and $R^{14}$ are each independently a substituted or unsubstituted $C_1$-$C_{10}$ monovalent hydrocarbon group and n is an integer of 0 to 2 in the presence of an acid amide compound and a platinum catalyst.

Preferably, the acid amide compound is a carboxylic acid amide compound having the general formula (5):

$$R^{15}-[C(O)-NR^{16}{}_2]_k \quad (5)$$

wherein $R^{15}$ is hydrogen or a $C_1$-$C_{30}$ k-valent hydrocarbon group, $R^{16}$ is each independently hydrogen or a $C_1$-$C_{30}$ monovalent hydrocarbon group, and k is an integer of 1 or 2, or a primary acid amide compound having the general formula (6):

$$R^{17}-C(=O)-NH_2 \quad (6)$$

wherein $R^{17}$ is hydrogen or a $C_1$-$C_{30}$ monovalent hydrocarbon group.

Advantageous Effects of Invention

The method of the invention enables to introduce 4 silicon atoms to form silanol groups via 4 nitrogen atoms in the glycoluril ring. Then a glycoluril ring-containing organosilicon compound having 4 organoxysilyl groups to form silanol groups capable of covalently bonding with hydroxyl groups on an inorganic material surface is obtained in high purity. The glycoluril organosilicon compound can impart excellent mechanical strength and adhesion to organic/inorganic composite materials. The glycoluril organosilicon compound exerts the desired effects when used as a silane coupling agent, resin additive, surface treating agent, textile treating agent, adhesive, paint additive, polymer modifier or the like.

DESCRIPTION OF PREFERRED EMBODIMENTS

Figure 1:
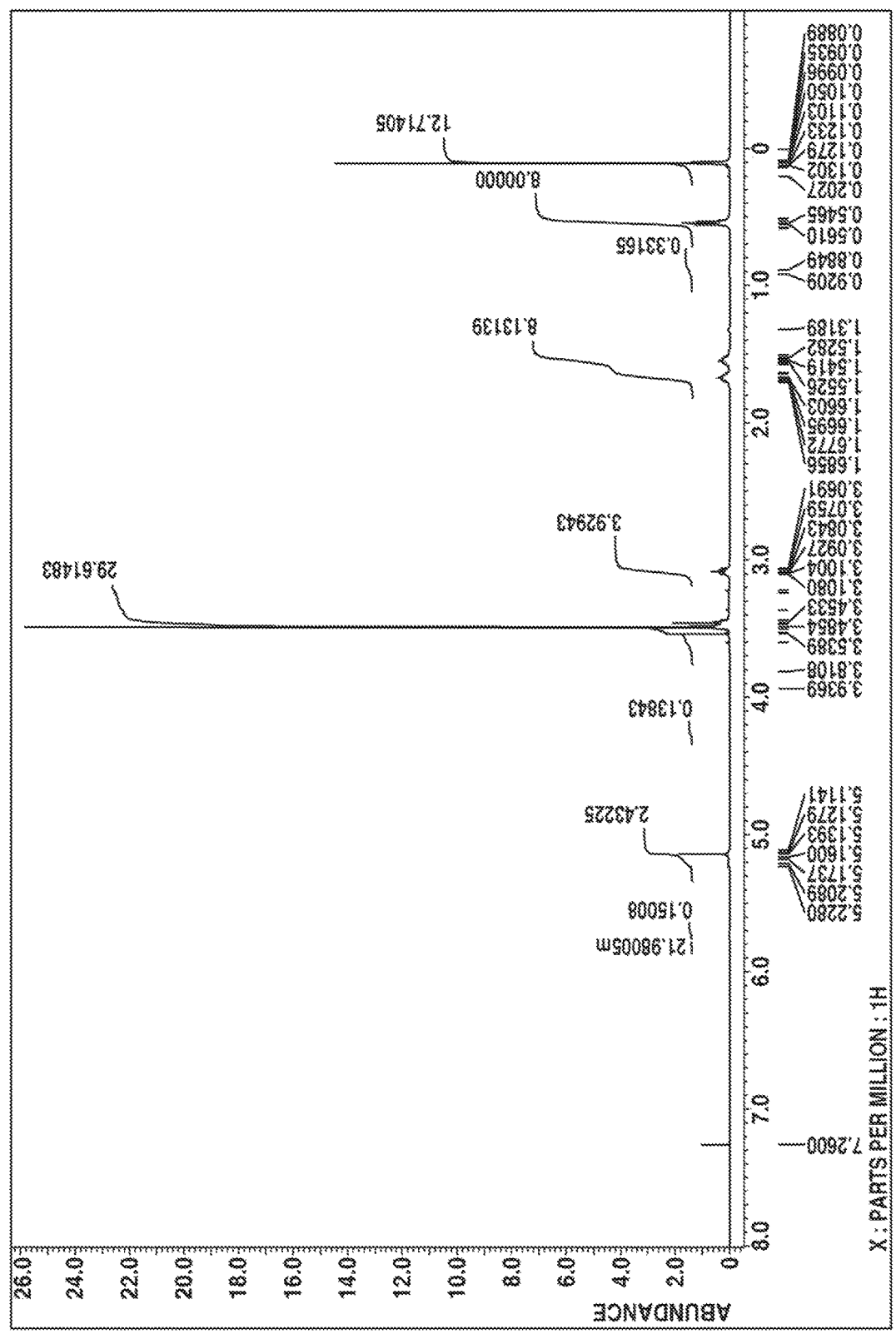
FIG. 1 is a diagram of the $^1$H-NMR spectrum of the compound obtained in Example 1.

The notation (Cn-Cm) means a group containing from n to m carbon atoms per group.

The invention provides a glycoluril ring-containing organosilicon compound having the general formula (1).

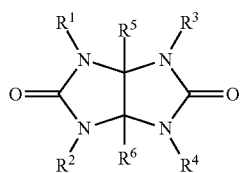

(1)

In formula (1), $R^5$ and $R^6$ are each independently hydrogen or a substituted or unsubstituted $C_1$-$C_{10}$ monovalent hydrocarbon group. $R^1$, $R^2$, $R^3$ and $R^4$ are each a hydrolyzable organoxysilyl group having the general formula (2).

$$-R^7-SiR^8{}_n(OR^9)_{3-n} \quad (2)$$

In formula (2), $R^7$ is a substituted or unsubstituted $C_3$-$C_6$ divalent hydrocarbon group. $R^8$ and $R^9$ are each independently a substituted or unsubstituted $C_1$-$C_{10}$ monovalent hydrocarbon group, and n is an integer of 0 to 2.

In the above formulae, the $C_1$-$C_{10}$ monovalent hydrocarbon group may be straight, branched or cyclic. Illustrative examples include straight alkyl groups such as methyl, ethyl, n-propyl, n-butyl, n-pentyl, n-hexyl, n-heptyl, n-octyl, n-nonyl and n-decyl; branched alkyl groups such as isopropyl, isobutyl, tert-butyl, sec-butyl, isopentyl, neopentyl, isohexyl, isoheptyl, isooctyl, tert-octyl, isononyl and isodecyl; cyclic alkyl groups such as cyclopentyl and cyclohexyl; alkenyl groups such as vinyl, allyl, butenyl and methallyl; and aryl groups such as phenyl, tolyl and xylyl.

Also included are substituted forms of the foregoing monovalent hydrocarbon groups in which one or more or even all hydrogen atoms are substituted by other substituents. Suitable substituents include alkoxy groups such as methoxy, ethoxy and (iso)propoxy; halogen atoms such as fluorine, chlorine and bromine; aromatic hydrocarbon groups such as phenyl; cyano, amino, ester, ether, carbonyl, acyl, and sulfide groups, which may be used alone or in admixture of two or more. Neither the site of substitution nor the number of substituents is limited.

The $C_3$-$C_6$ divalent hydrocarbon group may be straight, branched or cyclic. Illustrative examples include alkylene groups such as trimethylene, propylene, tetramethylene and isobutylene. The divalent hydrocarbon groups may have one or more groups intervening in the molecular chain, such as ether, ester, carbonyl, sulfide and disulfide groups.

Of these, $R^5$ and $R^6$ in formula (1) each are preferably hydrogen, a $C_1$-$C_5$ alkyl or $C_6$-$C_{10}$ aryl group, more preferably hydrogen, methyl, ethyl, propyl, isopropyl, phenyl, tolyl or xylyl, for availability of the precursor.

In formula (2), $R^7$ is preferably a $C_3$ or $C_4$ divalent hydrocarbon group. For availability of the precursor, trimethylene is more preferred. $R^8$ and $R^9$ each are preferably a $C_1$-$C_5$ alkyl group. For availability of the precursor, $R^8$ and $R^9$ are more preferably straight $C_1$-$C_5$ alkyl and even more preferably methyl or ethyl. The subscript n is an integer of 0 to 2. It is preferred that n be an integer of 1 or 2 because the organosilicon compound used as a silane coupling agent or resin additive has age stability after hydrolysis and compatibility with resins and solvents.

Examples of the hydrolyzable organoxysilyl group of formula (2) include dimethylmethoxysilylpropyl, methyldimethoxysilylpropyl, trimethoxysilylpropyl, dimethylethoxysilylpropyl, methyldiethoxysilylpropyl, and triethoxysilylpropyl. Preference is given to dimethylmethoxysilylpropyl, methyldimethoxysilylpropyl, dimethylethoxysilylpropyl and methyldiethoxysilylpropyl because the organosilicon compound used as a silane coupling agent or resin additive has age stability after hydrolysis and compatibility with resins and solvents.

Examples of the glycoluril ring-containing organosilicon compound having formula (1) include 1,3,4,6-tetrakis(dimethylmethoxysilylpropyl)glycoluril, 1,3,4,6-tetrakis(methyldimethoxysilylpropyl)glycoluril, 1,3,4,6-tetrakis(trimethoxysilylpropyl)glycoluril, 1,3,4,6-tetrakis(dimethylethoxysilylpropyl)glycoluril, 1,3,4,6-tetrakis(methyldiethoxysilylpropyl)glycoluril and 1,3,4,6-tetrakis(triethoxysilylpropyl)glycoluril. Of these, 1,3,4,6-tetrakis(dimethylmethoxysilylpropyl)glycoluril, 1,3,4,6-tetrakis(methyldimethoxysilylpropyl)glycoluril, 1,3,4,6-tetrakis(dimethylethoxysilylpropyl)glycoluril and 1,3,4,6-tetrakis(methyldiethoxysilylpropyl)glycoluril are preferred because these compounds, when used as a silane coupling agent or resin additive, have age stability after hydrolysis and compatibility with resins and solvents.

The glycoluril ring-containing organosilicon compound may be used in any desired to applications. Typical applications include, but are not limited to, silane coupling agents, resin additives, surface treating agents, textile treating agents, adhesives, paint additives, and polymer modifiers. Particularly when the organosilicon compound is applied to organic/inorganic composite materials, it imparts excellent mechanical strength and adhesion thereto. Examples of the inorganic material include metal plates, glass plates, metal fibers, glass fibers, powder silica, powder alumina, powder talc, and powder calcium carbonate. Examples of the organic material include thermosetting resins such as phenolic resins, epoxy resins and urethane resins and thermoplastic resins such as polyethylene, polypropylene, polycarbonate and polyphenylene sulfide.

When the glycoluril ring-containing organosilicon compound is used in various applications, it may be used as such, but preferably diluted with a suitable solvent prior to use for ease of handling or coating. Suitable solvents include water; alcohol solvents such as methanol and ethanol; hydrocarbon solvents such as pentane, hexane, cyclohexane, heptane, isooctane, benzene, toluene and xylene; ketone solvents such as acetone and methyl isobutyl ketone, ether solvents such as diethyl ether, tetrahydrofuran and dioxane; ester solvents such as ethyl acetate and butyl acetate; aprotic polar solvents such as acetonitrile and N,N-dimethylformamide; and chlorinated hydrocarbon solvents such as dichloromethane and chloroform, with water and alcohol solvents being preferred. Although the concentration of the organosilicon compound is not particularly limited, the organosilicon compound is preferably diluted to a concentration of 0.001 to 50% by weight, prior to use.

The glycoluril ring-containing organosilicon compound may be used in the form of a composition comprising the same and at least one additive selected from pigments, defoamers, lubricants, preservatives, pH control agents, film formers, antistatic agents, anti-fungus agents, surfactants, and dyes as long as the benefits of the invention are not impaired.

Now it is described how to prepare the glycoluril ring-containing organosilicon compound having formula (1). According to the invention, the glycoluril ring-containing organosilicon compound having formula (1) is prepared by hydrosilylation reaction of a glycoluril ring-containing alkenyl compound having the general formula (3) (designated Compound (3), hereinafter) with an organoxysilyl-containing hydrogensilane compound having the general formula (4) (designated Compound (4), hereinafter) in the presence of an acid amide compound and a platinum catalyst.

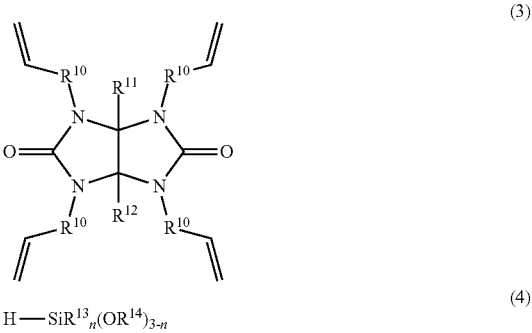

$$H\!\!-\!\!SiR^{13}{}_n(OR^{14})_{3-n} \quad (4)$$

In formula (3), $R^{10}$ is a substituted or unsubstituted $C_1$-$C_4$ divalent hydrocarbon group. $R^{11}$ and $R^{12}$ are each independently hydrogen or a substituted or unsubstituted $C_1$-$C_{10}$ monovalent hydrocarbon group. In formula (4), $R^{13}$ and $R^{14}$ are each independently a substituted or unsubstituted $C_1$-$C_{10}$ monovalent hydrocarbon group and n is an integer of 0 to 2.

$R^{10}$ is a substituted or unsubstituted divalent hydrocarbon group of 1 to 4 carbon atoms, preferably 1 or 2 carbon atoms, which may be straight or branched. Illustrative examples include alkylene groups such as methylene and ethylene. The hydrocarbon group may have one or more groups intervening in the molecular chain, such as ether, ester, carbonyl, sulfide and disulfide groups.

The $C_1$-$C_{10}$ monovalent hydrocarbon groups $R^{11}$ and $R^{12}$ are as exemplified above for $R^8$ and $R^9$. $R^{11}$ and $R^{12}$ are preferably selected from hydrogen, alkyl groups such as methyl, ethyl, propyl and isopropyl, and aryl groups such as phenyl, tolyl and xylyl.

Examples of Compound (3) include 1,3,4,6-tetraallylglycoluril, 1,3,4,6-tetraallyl-3a-methylglycoluril, 1,3,4,6-tetraallyl-3a,6a-dimethylglycoluril, and 1,3,4,6-tetraallyl-3a,6a-diphenylglycoluril.

The $C_1$-$C_{10}$ monovalent hydrocarbon groups $R^{13}$ and $R^{14}$ are as exemplified above for $R^8$ and $R^9$. Preferred are $C_1$-$C_5$ alkyl groups such as methyl and ethyl.

Examples of Compound (4) include dimethylmethoxysilane, methyldimethoxysilane, trimethoxysilane, dimethylethoxysilane, methyldiethoxysilane, and triethoxysilane.

Compound (3) and Compound (4) may be combined in any desired ratio. It is preferred from the aspects of reactivity and productivity that 4 to 20 moles, more preferably 4 to 10 moles, and even more preferably 4 to 5 moles of Compound (4) be used per mole of Compound (3).

The platinum catalyst used herein may be selected from well-known platinum (Pt) and complex compounds having Pt as the central metal. Examples include chloroplatinic acid, alcohol solutions of chloroplatinic acid, a toluene or xylene solution of platinum-1,3-divinyl-1,1,3,3-tetramethyldisiloxane complex, dichlorobis(acetonitrile)platinum, dichlorobis(benzonitrile)platinum, and dichloro(cyclooctadiene)platinum. Platinum black on supports such as alumina, silica and carbon may also be used. Among others, an alcohol solution of chloroplatinic acid and a toluene or xylene solution of platinum-1,3-divinyl-1,1,3,3-tetramethyldisiloxane complex are preferred for reactivity.

The amount of the platinum catalyst used is not particularly limited as long as a catalytic effect on hydrosilylation reaction is exerted. From the aspects of reactivity and productivity, the catalyst is preferably used in an amount of 0.000001 to 1 mole, more preferably 0.00001 to 0.1 mole, and even more preferably 0.0001 to 0.01 mole of platinum metal per mole of Compound (3). Less than 0.000001 mole of the platinum catalyst (i.e., platinum metal) may fail to exert a catalytic effect. An amount of more than 1 mole is unfavorable in view of productivity and because a reaction promoting effect commensurate with that catalyst amount may not be obtained.

In the inventive method, an acid amide compound is used as a hydrosilylation co-catalyst along with the platinum catalyst. Although the acid amide compound is not particularly limited, it is preferably a carboxylic acid amide compound having the general formula (5) which is obtained from a carboxylic acid and an amine. A primary acid amide compound having the general formula (6) is also preferred from the aspect of effectiveness per unit amount.

(5)

(6)

In formula (5), $R^{15}$ is hydrogen or a k-valent hydrocarbon group of 1 to 30 carbon atoms, preferably 1 to 20 carbon atoms, $R^{16}$ is each independently hydrogen or a monovalent hydrocarbon group of 1 to 30 carbon atoms, preferably 1 to 6 carbon atoms, and k is an integer of 1 or 2.

Examples of the monovalent hydrocarbon group $R^{15}$ include alkyl groups such as methyl, ethyl, n-propyl, isopropyl, n-butyl, n-hexyl, pentadecyl, heptadecyl and cyclohexyl, aryl groups such as phenyl, and alkenyl groups such as vinyl. Examples of the divalent hydrocarbon group $R^{15}$ include alkylene groups such as methylene, ethylene, trimethylene and propylene, alkenylene groups such as vinylene, and arylene groups such as phenylene.

Examples of the monovalent hydrocarbon group $R^{16}$ include alkyl groups such as methyl, ethyl, n-propyl, isopropyl, n-butyl, n-hexyl and cyclohexyl and aryl groups such as phenyl.

In formula (6), $R^{17}$ is hydrogen or a monovalent hydrocarbon group of 1 to 30 carbon atoms, preferably 1 to 20 carbon atoms, examples of which are as exemplified above for $R^{15}$ in formula (5).

Examples of the acid amide compounds of formulae (5) and (6) include formamide, acetamide, N-methylacetamide, N,N-dimethylacetamide, propionamide, acrylamide, malonamide, succinamide, maleamide, fumaramide, benzamide, phthalamide, palmitamide, and stearamide. These are commercially available as reagents. Formamide, acetamide, benzamide and stearamide are preferred from the aspects of availability and co-catalytic effects.

The amount of the acid amide compound used is not particularly limited as long as co-catalytic effects (i.e., reaction promoting effects) are exerted. The acid amide compound is preferably used in an amount of 0.00001 to 10 moles, more preferably 0.0001 to 1 mole, and even more preferably 0.001 to 0.1 mole per mole of Compound (3) for reactivity and productivity. Less than 0.00001 mole of the acid amide compound may fail to exert a sufficient co-catalytic effect. More than 10 moles of the acid amide compound is unfavorable in view of productivity and such excessive co-catalyst can rather reduce the activity of the platinum catalyst.

Although the temperature of hydrosilylation reaction is not particularly limited, it is preferably in a range of 50 to 200° C., more preferably 50 to 150° C., and even more preferably 50 to 100° C. for reactivity and productivity. The reaction time is preferably 1 to 30 hours, more preferably 1 to 20 hours, and more preferably 1 to 10 hours, though not limited thereto.

Although the hydrosilylation reaction may take place in a solventless system, a solvent may be used. Suitable solvents include hydrocarbon solvents such as pentane, hexane, cyclohexane, heptane, isooctane, benzene, toluene and xylene; ether solvents such as diethyl ether, tetrahydrofuran and dioxane; ester solvents such as ethyl acetate and butyl acetate; aprotic polar solvents such as acetonitrile and N,N-dimethylformamide; and chlorinated hydrocarbon solvents such as dichloromethane and chloroform. These solvents may be used alone or in admixture of two or more.

EXAMPLE

Examples of the invention are given below by way of illustration and not by way of limitation.

Example 1

Synthesis of 1,3,4,6-tetrakis(methyldimethoxysilylpropyl)glycoluril

A flask equipped with a stirrer, reflux condenser, dropping funnel and thermometer was charged with 15.12 g (0.050 mol) of 1,3,4,6-tetraallylglycoluril, 0.045 g (0.0010 mol) of formamide, and an amount (to give 0.000010 mol of platinum atoms) of a toluene solution of platinum-1,3-divinyl-1,1,3,3-tetramethyldisiloxane complex, and heated at 60° C. Once the internal temperature became steady, 21.24 g (0.20 mol) of methyldimethoxysilane was added dropwise over one hour. The contents were stirred for one hour at the temperature. The resulting solution was filtered and then dried under vacuum at 100° C. for one hour, obtaining 35.90 g (0.049 mol, yield 98.73%) of a colorless clear liquid compound.

On analysis by gel permeation chromatography (GPC), the ratio in area % of 1,3,4,6-tetraallylglycoluril as reactant: 1-(methyldimethoxysilylpropyl)-3,4,6-triallylglycoluril as product: 1,3-bis(methyldimethoxysilylpropyl)-4,6-diallylglycoluril as product: 1,3,4-tris(methyldimethoxysilylpropyl)-6-monoallylglycoluril as product: 1,3,4,6-tetrakis(methyldimethoxysilylpropyl)glycoluril as product was 0:0:0:0:100.

Figure 2:
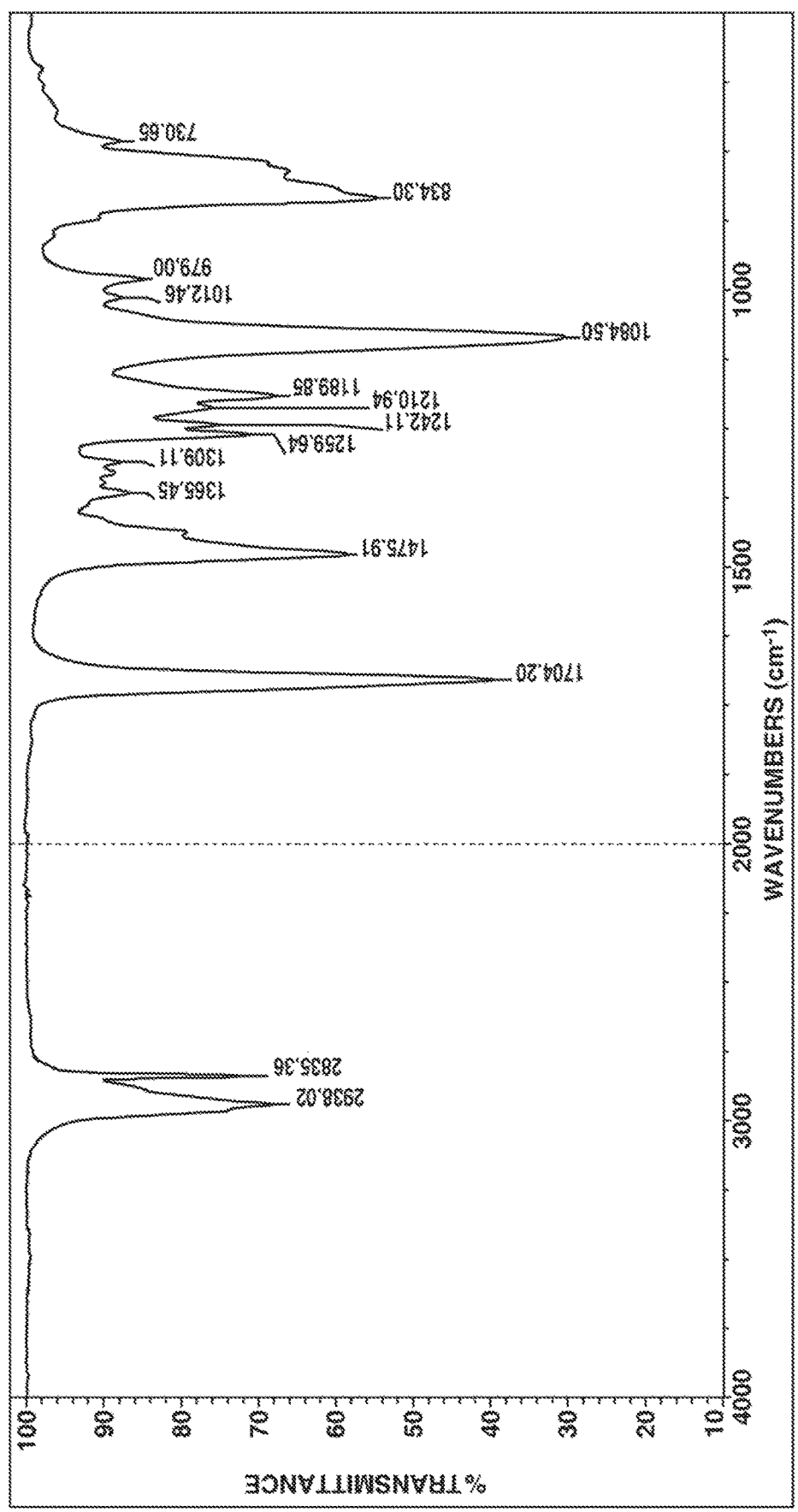
FIG. 2 is a diagram of the IR spectrum of the compound obtained in Example 1.

The resulting compound was analyzed by $^1$H-NMR spectroscopy (deuterated chloroform solvent) and IR spectroscopy, with the results shown in FIGS. 1 and 2, respectively.

From these data, the compound was identified to be 1,3,4,6-tetrakis(methyldimethoxysilylpropyl)glycoluril having 4 organoxysilyl groups via 4 nitrogen atoms in the glycoluril ring.

Example 2

Synthesis of 1,3,4,6-tetrakis(trimethoxysilylpropyl)glycoluril

Reaction was performed as in Example 1 except that 24.44 g (0.20 mol) of trimethoxysilane was used instead of methyldimethoxysilane. The resulting solution was filtered and then dried under vacuum at 100° C. for one hour, obtaining 39.10 g (0.049 mol, yield 98.84%) of a colorless clear liquid compound.

On analysis of the compound by GPC, the ratio in area % of 1,3,4,6-tetraallylglycoluril as reactant: 1-(trimethoxysilylpropyl)-3,4,6-triallylglycoluril as product: 1,3-bis(trimethoxysilylpropyl)-4,6-diallylglycoluril as product: 1,3,4-tris(trimethoxysilylpropyl)-6-monoallylglycoluril as product: 1,3,4,6-tetrakis(trimethoxysilylpropyl)glycoluril as product was 0:0:0:0:100.

Figure 3:
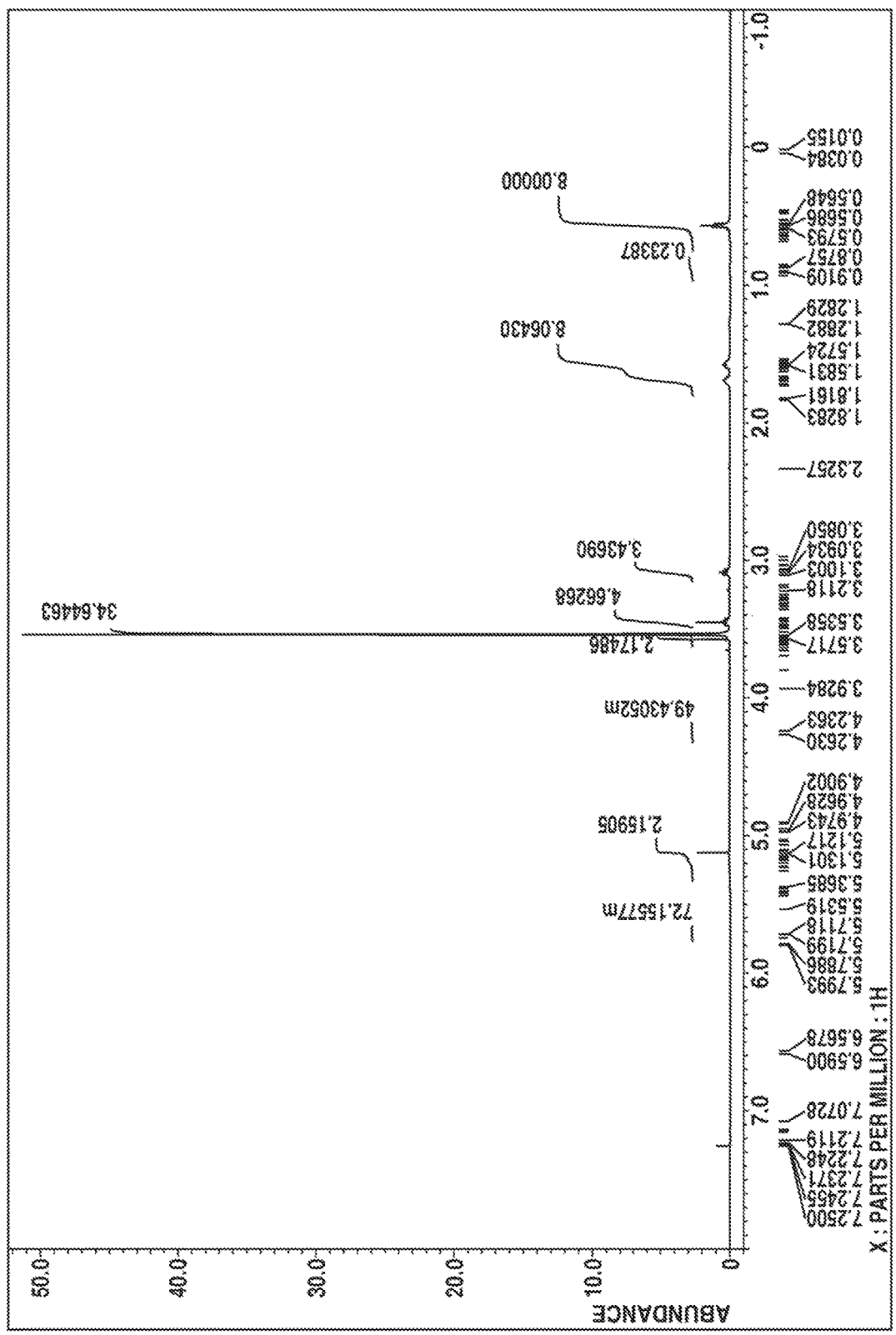
FIG. 3 is a diagram of the $^1$H-NMR spectrum of the compound obtained in Example 2.
Figure 4:
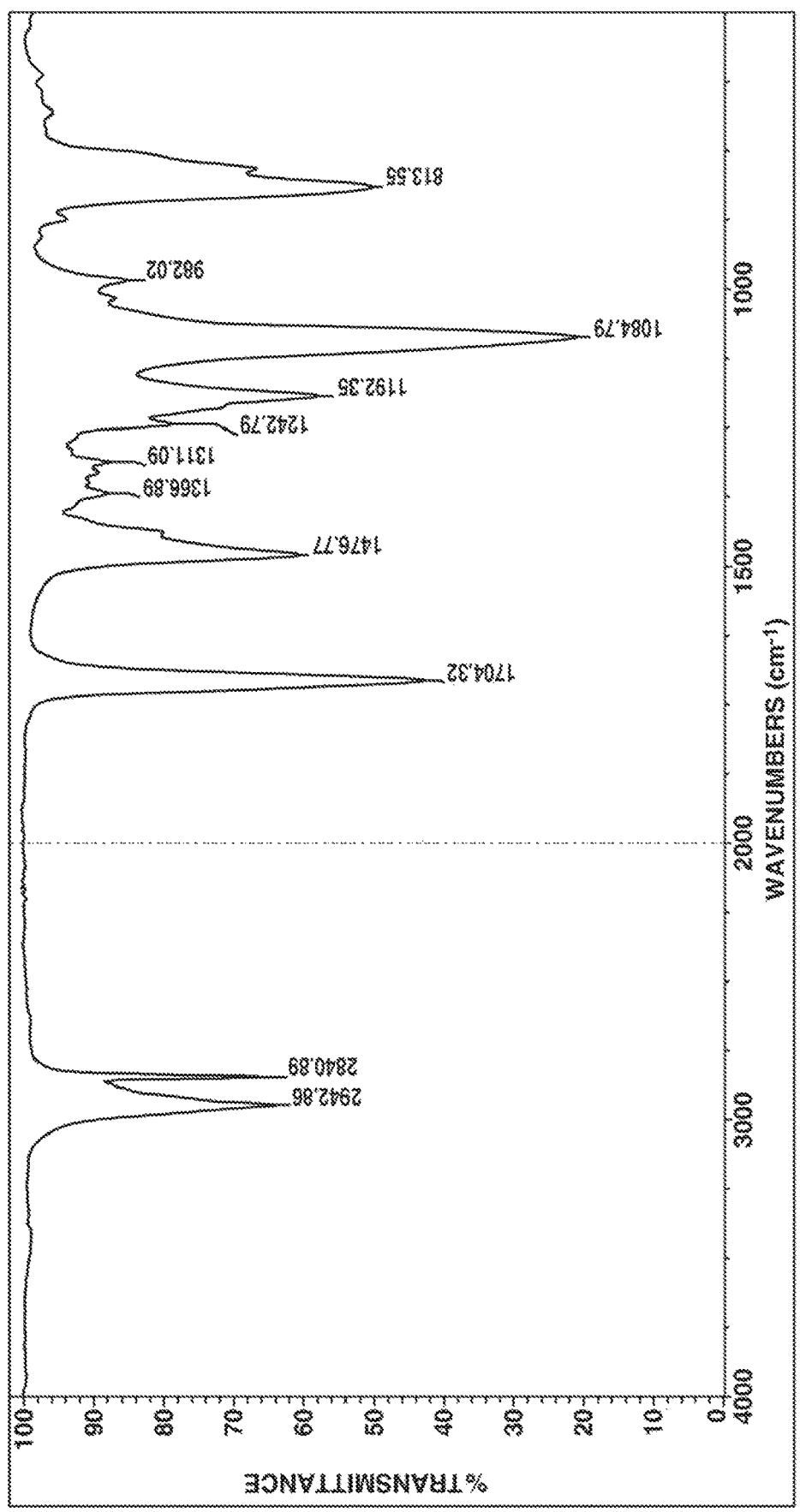
FIG. 4 is a diagram of the IR spectrum of the compound obtained in Example 2.

The compound was analyzed by $^1$H-NMR spectroscopy (deuterated chloroform solvent) and IR spectroscopy, with the results shown in FIGS. 3 and 4, respectively.

From these data, the compound was identified to be 1,3,4,6-tetrakis(trimethoxysilylpropyl)glycoluril having 4 organoxysilyl groups via 4 nitrogen atoms in the glycoluril ring.

Example 3

Synthesis of 1,3,4,6-tetrakis(methyldiethoxysilylpropyl)glycoluril

Reaction was performed as in Example 1 except that 26.85 g (0.20 mol) of methyldiethoxysilane was used instead of methyldimethoxysilane. The resulting solution was filtered and then dried under vacuum at 100° C. for one hour, obtaining 41.30 g (0.049 mol, yield 98.40%) of a colorless clear liquid compound.

On analysis of the compound by GPC, the ratio in area % of 1,3,4,6-tetraallylglycoluril as reactant: 1-(methyldiethoxysilylpropyl)-3,4,6-triallylglycoluril as product: 1,3-bis(methyldiethoxysilylpropyl)-4,6-diallylglycoluril as product: 1,3,4-tris(methyldiethoxysilylpropyl)-6-monoallylglycoluril as product: 1,3,4,6-tetrakis(methyldiethoxysilylpropyl)glycoluril as product was 0:0:0:0:100.

Figure 5:
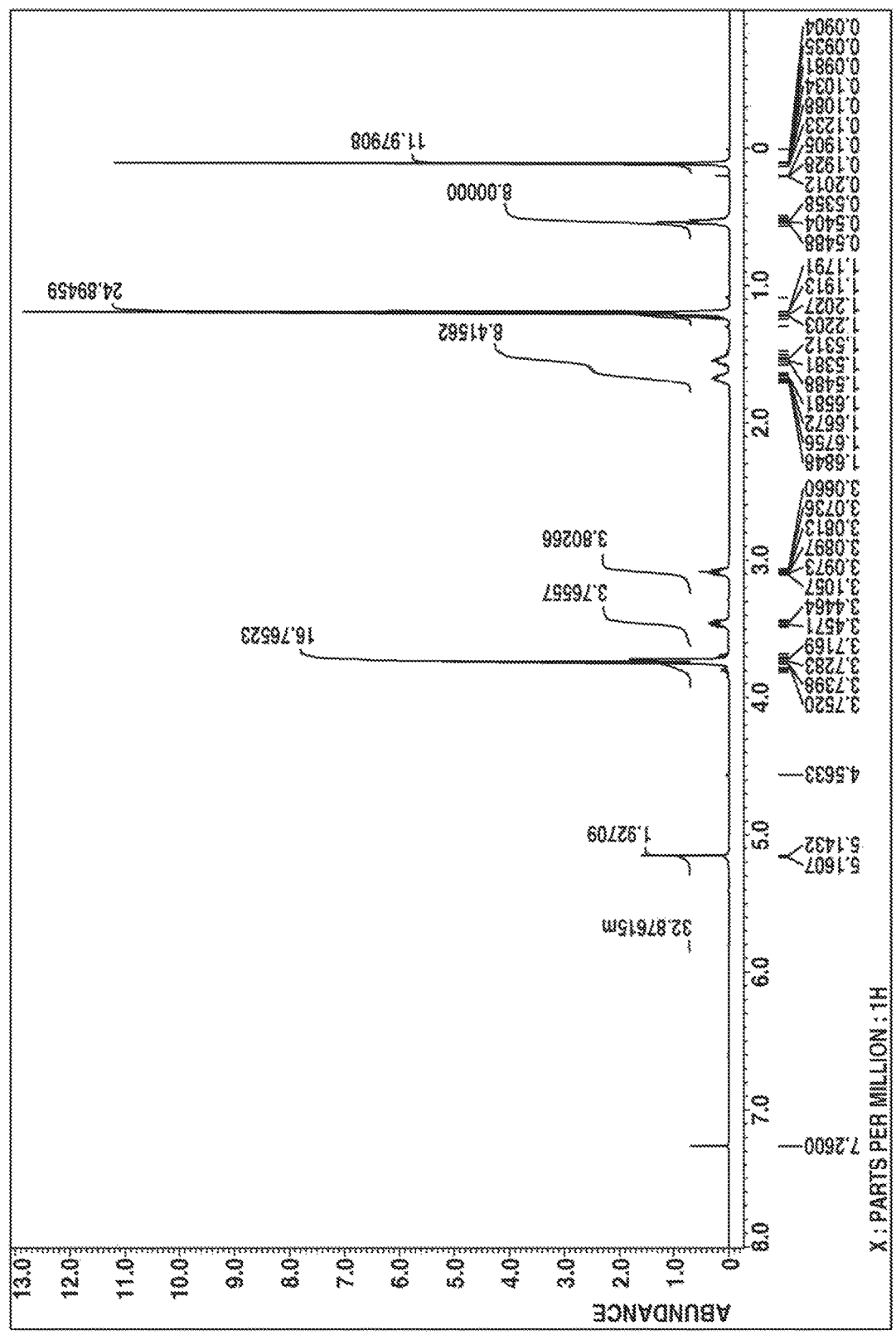
FIG. 5 is a diagram of the $^1$H-NMR spectrum of the compound obtained in Example 3.
Figure 6:
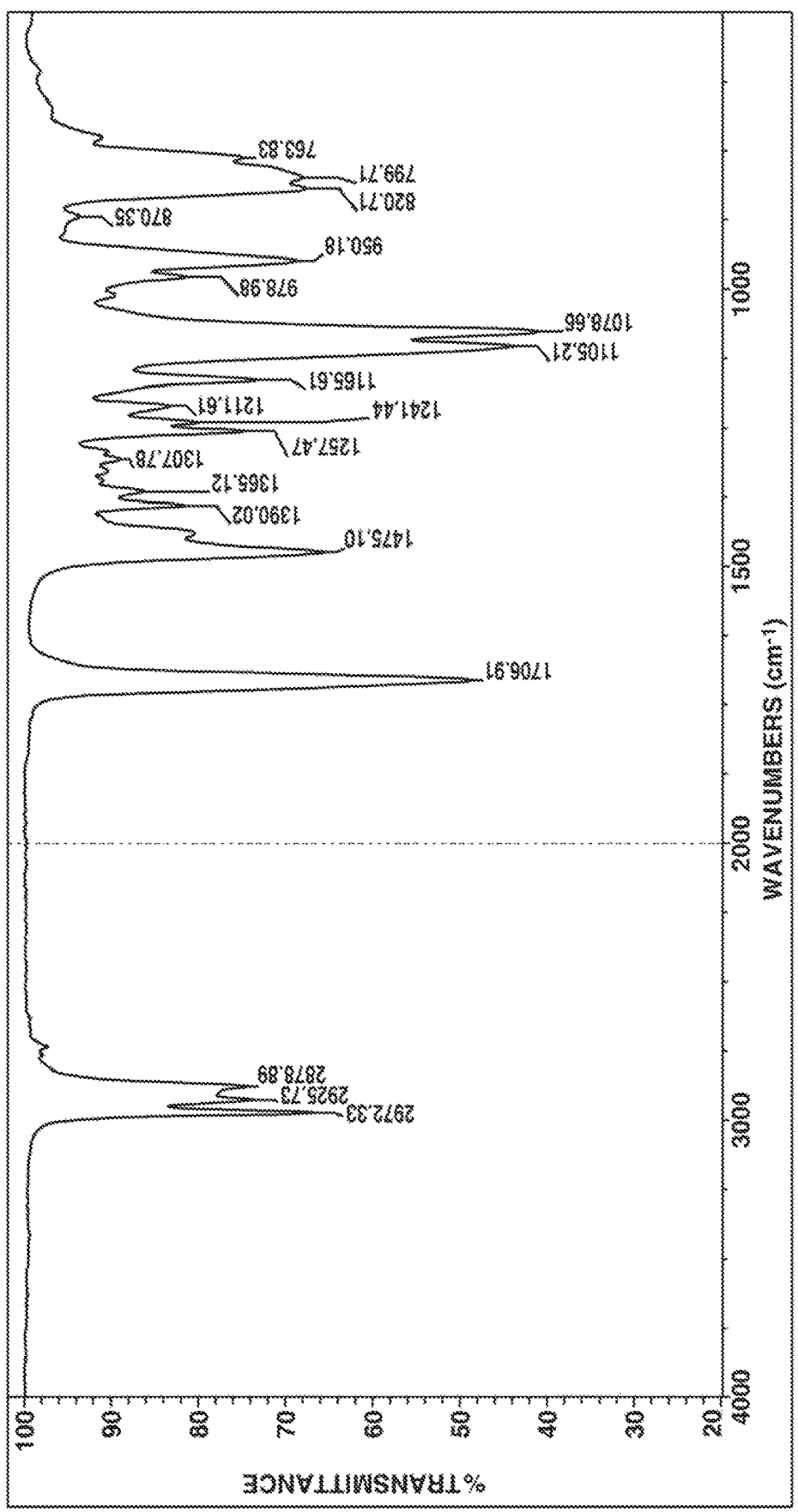
FIG. 6 is a diagram of the IR spectrum of the compound obtained in Example 3.

The compound was analyzed by $^1$H-NMR spectroscopy (deuterated chloroform solvent) and IR spectroscopy, with the results shown in FIGS. 5 and 6, respectively.

From these data, the compound was identified to be 1,3,4,6-tetrakis(methyldiethoxysilylpropyl)glycoluril having 4 organoxysilyl groups via 4 nitrogen atoms in the glycoluril ring.

Example 4

Synthesis of 1,3,4,6-tetrakis(triethoxysilylpropyl)glycoluril

Reaction was performed as in Example 1 except that 32.86 g (0.20 mol) of triethoxysilane was used instead of methyldimethoxysilane. The resulting solution was filtered and then dried under vacuum at 100° C. for one hour, obtaining 47.30 g (0.049 mol, yield 98.58%) of a colorless clear liquid compound.

On analysis of the compound by GPC, the ratio in area % of 1,3,4,6-tetraallylglycoluril as reactant: 1-(triethoxysilylpropyl)-3,4,6-triallylglycoluril as product: 1,3-bis(triethoxysilylpropyl)-4,6-diallylglycoluril as product: 1,3,4-tris(triethoxysilylpropyl)-6-monoallylglycoluril as product: 1,3,4,6-tetrakis(triethoxysilylpropyl)glycoluril as product was 0:0:0:0:100.

Figure 7:
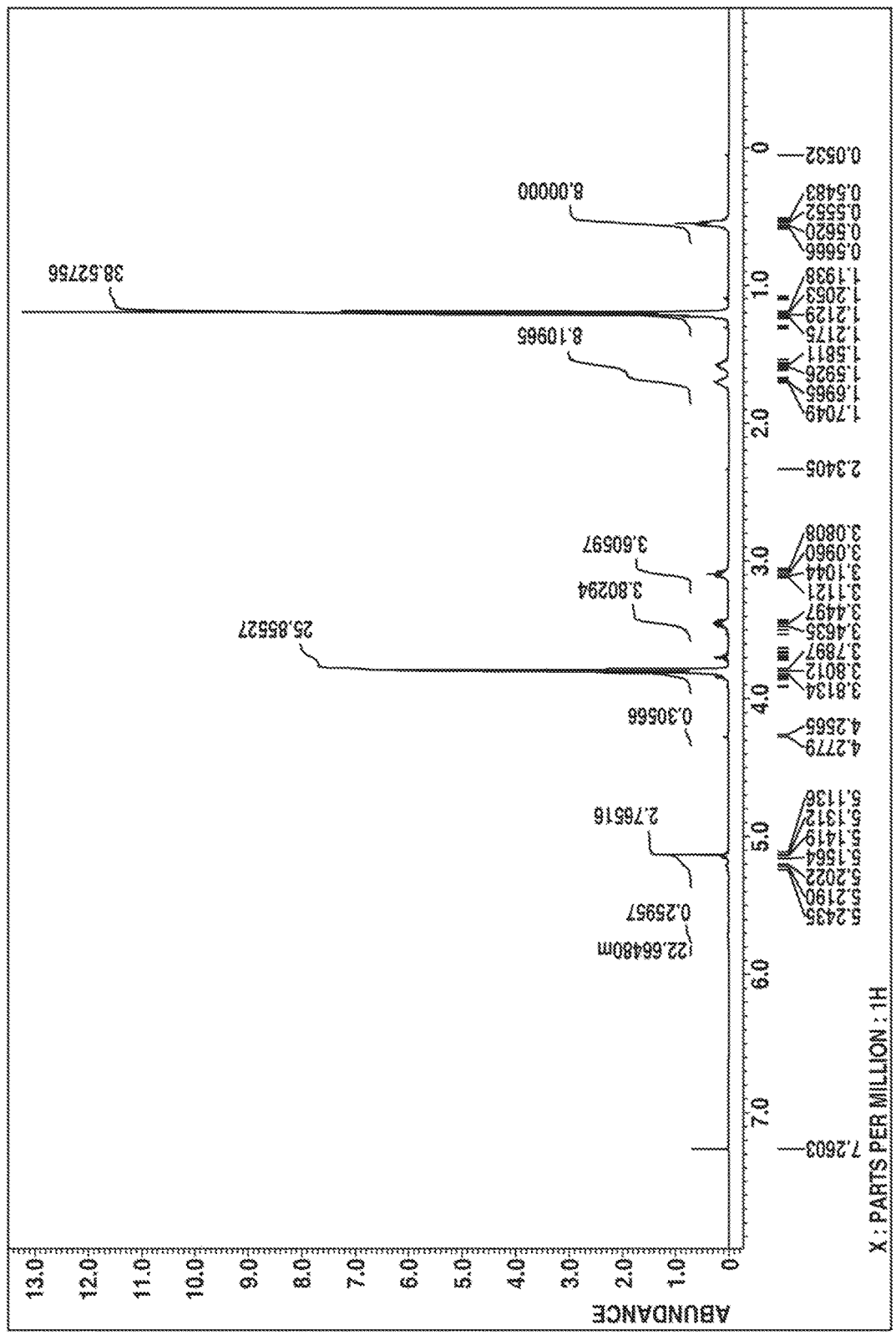
FIG. 7 is a diagram of the $^1$H-NMR spectrum of the compound obtained in Example 4.
Figure 8:
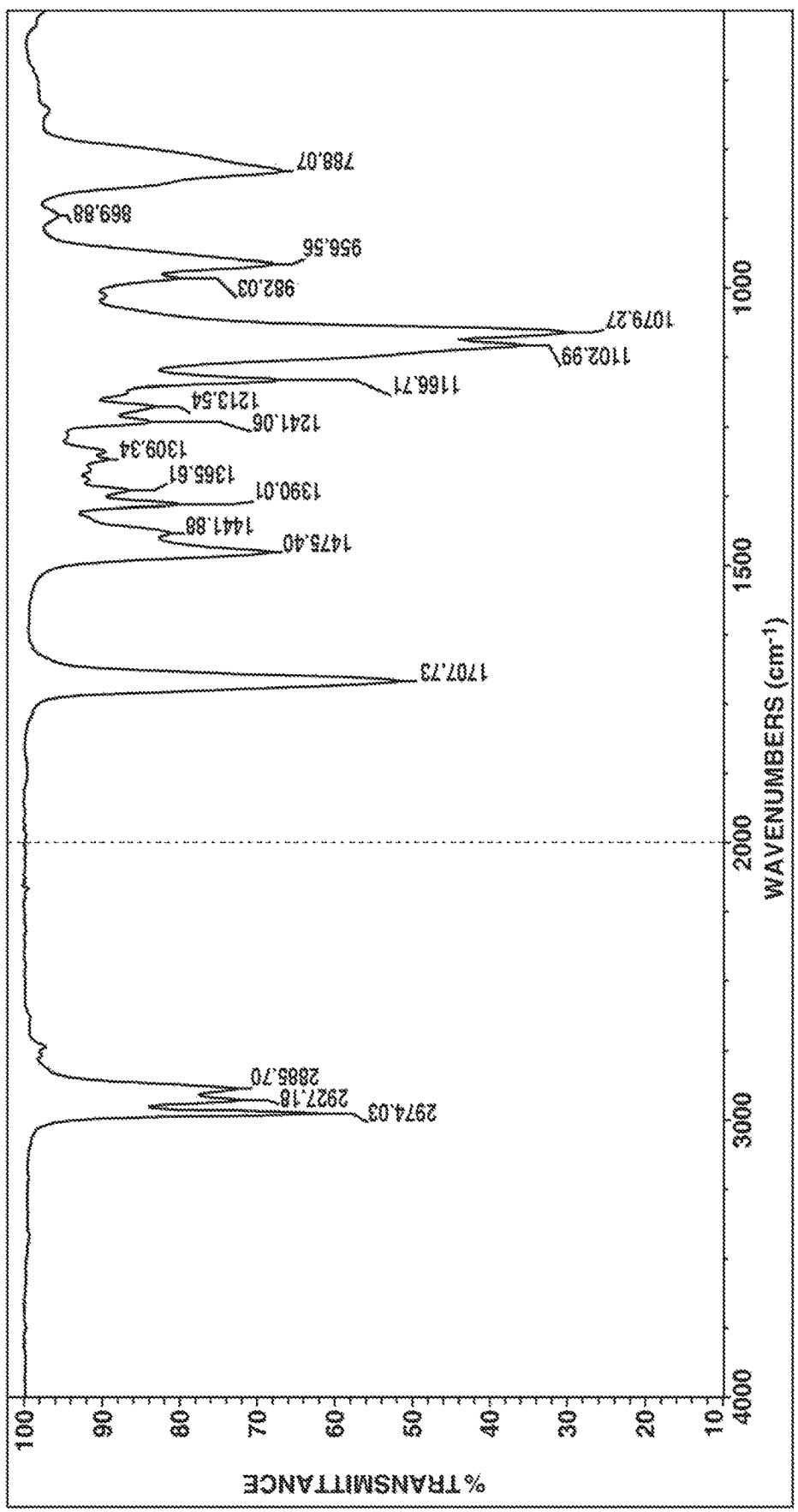
FIG. 8 is a diagram of the IR spectrum of the compound obtained in Example 4.

The compound was analyzed by $^1$H-NMR spectroscopy (deuterated chloroform solvent) and IR spectroscopy, with the results shown in FIGS. 7 and 8, respectively.

From these data, the compound was identified to be 1,3,4,6-tetrakis(triethoxysilylpropyl)glycoluril having 4 organoxysilyl groups via 4 nitrogen atoms in the glycoluril ring.

Example 5

Synthesis of 1,3,4,6-tetrakis(methyldimethoxysilylpropyl)glycoluril

Reaction was performed as in Example 1 except that 0.059 g (0.0010 mol) of acetamide was used instead of formamide. The resulting solution was filtered and then dried under vacuum at 100° C. for one hour, obtaining 35.91 g (0.049 mol, yield 98.76%) of a colorless clear liquid compound.

On analysis of the compound by GPC, the ratio in area % of 1,3,4,6-tetraallylglycoluril as reactant: 1-(methyldimethoxysilylpropyl)-3,4,6-triallylglycoluril as product: 1,3-bis(methyldimethoxysilylpropyl)-4,6-diallylglycoluril as product: 1,3,4-tris(methyldimethoxysilylpropyl)-6-monoallylglycoluril as product: 1,3,4,6-tetrakis(methyldimethoxysilylpropyl)glycoluril as product was 0:0:0:0:100.

Example 6

Synthesis of 1,3,4,6-tetrakis(methyldimethoxysilylpropyl)glycoluril

Reaction was performed as in Example 1 except that 0.12 g (0.0010 mol) of benzamide was used instead of formamide. The resulting solution was filtered and then dried under vacuum at 100° C. for one hour, obtaining 35.89 g (0.049 mol, yield 98.71%) of a colorless clear liquid compound.

On analysis of the compound by GPC, the ratio in area % of 1,3,4,6-tetraallylglycoluril as reactant: 1-(methyldimethoxysilylpropyl)-3,4,6-triallylglycoluril as product: 1,3-bis(methyldimethoxysilylpropyl)-4,6-diallylglycoluril as product: 1,3,4-tris(methyldimethoxysilylpropyl)-6-monoallylglycoluril as product: 1,3,4,6-tetrakis(methyldimethoxysilylpropyl)glycoluril as product was 0:0:0:0:100.

Example 7

Synthesis of 1,3,4,6-tetrakis(methyldimethoxysilylpropyl)glycoluril

Reaction was performed as in Example 1 except that 0.28 g (0.0010 mol) of stearamide was used instead of formamide. The resulting solution was filtered and then dried under vacuum at 100° C. for one hour, obtaining 35.92 g (0.049 mol, yield 98.79%) of a colorless clear liquid compound.

On analysis of the compound by GPC, the ratio in area % of 1,3,4,6-tetraallylglycoluril as reactant: 1-(methyldimethoxysilylpropyl)-3,4,6-triallylglycoluril as product: 1,3-bis(methyldimethoxysilylpropyl)-4,6-diallylglycoluril as product: 1,3,4-tris(methyldimethoxysilylpropyl)-6-monoallylglycoluril as product: 1,3,4,6-tetrakis(methyldimethoxysilylpropyl)glycoluril as product was 0:0:0:0:100.

Comparative Example 1

Synthesis of 1,3,4,6-tetrakis(methyldimethoxysilylpropyl)glycoluril

Reaction was performed as in Example 1 except that formamide was omitted.

On analysis of the resulting compound by GPC, the ratio in area % of 1,3,4,6-tetraallylglycoluril as reactant: 1-(methyldimethoxysilylpropyl)-3,4,6-triallylglycoluril as product: 1,3-bis(methyldimethoxysilylpropyl)-4,6-diallylglycoluril as product: 1,3,4-tris(methyldimethoxysilylpropyl)-6-monoallylglycoluril as product: 1,3,4,6-tetrakis(methyldimethoxysilylpropyl)glycoluril as product was 17:37:32:12:2.

Comparative Example 2

Synthesis of 1,3,4,6-tetrakis(methyldimethoxysilylpropyl)glycoluril

Reaction was performed as in Comparative Example 1 except that the amount (to give 0.000010 mol of platinum atoms) of the toluene solution of platinum-1,3-divinyl-1,1,3,3-tetramethyldisiloxane complex was changed to an amount to give 0.010 mol of platinum atoms.

On analysis of the compound by GPC, the ratio in area % of 1,3,4,6-tetraallylglycoluril as reactant: 1-(methyldimethoxysilylpropyl)-3,4,6-triallylglycoluril as product: 1,3-bis(methyldimethoxysilylpropyl)-4,6-diallylglycoluril as product: 1,3,4-tris(methyldimethoxysilylpropyl)-6-monoallylglycoluril as product: 1,3,4,6-tetrakis(methyldimethoxysilylpropyl)glycoluril as product was 0:2:8:38:52.

Japanese Patent Application No. 2018-076577 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A glycoluril ring-containing organosilicon compound having the general formula (1):

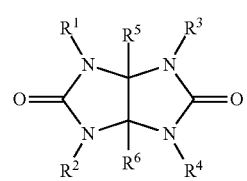

wherein $R^1$, $R^2$, $R^3$ and $R^4$ are each a group having the general formula (2):

$$-R^7-SiR^8{}_n(OR^9)_{3-n} \qquad (2)$$

wherein
$R^7$ is an unsubstituted $C_3$-$C_6$ divalent hydrocarbon group, wherein the $C_3$-$C_6$ divalent hydrocarbon group does not have one or more groups intervening in the molecular chain,
$R^8$ and $R^9$ are each independently a substituted or unsubstituted $C_1$-$C_{10}$ monovalent hydrocarbon group, and n is an integer of 0 to 2,
$R^5$ and $R^6$ are each independently hydrogen or a substituted or unsubstituted $C_1$-$C_{10}$ monovalent hydrocarbon group.

2. A method for preparing the glycoluril ring-containing organosilicon compound of claim 1, comprising the step of effecting hydrosilylation reaction of a glycoluril ring-containing alkenyl compound having the general formula (3):

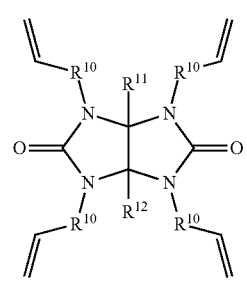

wherein $R^{10}$ is a substituted or unsubstituted $C_1$-$C_4$ divalent hydrocarbon group and $R^{11}$ and $R^{12}$ are each independently hydrogen or a substituted or unsubstituted $C_1$-$C_{10}$ monovalent hydrocarbon group, with an organoxysilyl-containing hydrogensilane compound having the general formula (4):

$$H-SiR^{13}{}_n(OR^{14})_{3-n} \qquad (4)$$

wherein $R^{13}$ and $R^{14}$ are each independently a substituted or unsubstituted $C_1$-$C_{10}$ monovalent hydrocarbon group and n is an integer of 0 to 2 in the presence of an acid amide compound and a platinum catalyst.

3. The method of claim 2 wherein the acid amide compound is a carboxylic acid amide compound having the general formula (5):

$$R^{15}-[C(=O)-NR^{16}{}_2]_k \qquad (5)$$

wherein $R^{15}$ is hydrogen or a $C_1$-$C_{30}$ k-valent hydrocarbon group, $R^{16}$ is each independently hydrogen or a $C_1$-$C_{30}$ monovalent hydrocarbon group, and k is an integer of 1 or 2, or a primary acid amide compound having the general formula (6):

$$R^{17}\text{---}C(\!\!=\!\!O)\text{---}NH_2 \tag{6}$$

wherein $R^{17}$ is hydrogen or a $C_1$-$C_{30}$ monovalent hydrocarbon group.

\* \* \* \* \*